United States Patent
Detzel

(10) Patent No.: US 9,688,932 B2
(45) Date of Patent: Jun. 27, 2017

(54) PLANT FOR THE PRODUCTION OF WOOD PELLETS OR OTHER SOLID GRANULATES FROM SMALL PIECES OF ORGANIC/PLANT MATERIAL

(71) Applicant: CEBCON Technologies GmbH, Hamburg (DE)

(72) Inventor: Valery Detzel, Hamburg (DE)

(73) Assignee: CEBCON Technologies GmbH, Hamburg (DE)

( * ) Notice: Subject to any disclaimer, the term of this patent is extended or adjusted under 35 U.S.C. 154(b) by 0 days.

(21) Appl. No.: 15/038,640

(22) PCT Filed: Nov. 26, 2014

(86) PCT No.: PCT/EP2014/075692
§ 371 (c)(1),
(2) Date: May 23, 2016

(87) PCT Pub. No.: WO2015/078925
PCT Pub. Date: Jun. 4, 2015

(65) Prior Publication Data
US 2016/0298045 A1    Oct. 13, 2016

(30) Foreign Application Priority Data
Nov. 27, 2013   (DE) ........................ 10 2013 224 204

(51) Int. Cl.
| | | |
|---|---|---|
| C10L 5/36 | (2006.01) |
| C10L 5/44 | (2006.01) |
| F28D 7/00 | (2006.01) |
| B01J 2/20 | (2006.01) |
| F28D 7/08 | (2006.01) |
| F28D 21/00 | (2006.01) |
| F28D 20/00 | (2006.01) |

(52) U.S. Cl.
CPC ................. *C10L 5/363* (2013.01); *B01J 2/20* (2013.01); *C10L 5/442* (2013.01); *C10L 5/445* (2013.01); *F28D 7/0041* (2013.01); *F28D 7/087* (2013.01); *C10L 2200/0469* (2013.01); *C10L 2290/06* (2013.01); *C10L 2290/08* (2013.01); *C10L 2290/30* (2013.01); *F28D 20/0039* (2013.01); *F28D 2021/0045* (2013.01); *Y02E 50/10* (2013.01); *Y02E 50/30* (2013.01)

(58) Field of Classification Search
USPC .......................................... 110/204, 208, 345
See application file for complete search history.

(56) References Cited

FOREIGN PATENT DOCUMENTS

| | | |
|---|---|---|
| DE | 10 2006 061 340 B3 | 5/2008 |
| EP | 1849851 A2 | 10/2007 |
| EP | 2330371 A1 | 6/2011 |
| WO | 00/26593 | 5/2000 |

*Primary Examiner* — Prem C Singh
*Assistant Examiner* — Chantel Graham
(74) *Attorney, Agent, or Firm* — Vidas, Arrett & Steinkraus, P.A.

(57) ABSTRACT

A pellet cooling device featuring energy-efficient heat recovery in a plant for producing wood pellets or other solid granulates from small pieces of organic material, said plant comprising devices for feeding, processing, drying, compressing, cooling and discharging the material. At least some of said devices are arranged in containers that can be individually transported and can be modularly combined to form at least a substantial portion of the plant.

23 Claims, 6 Drawing Sheets

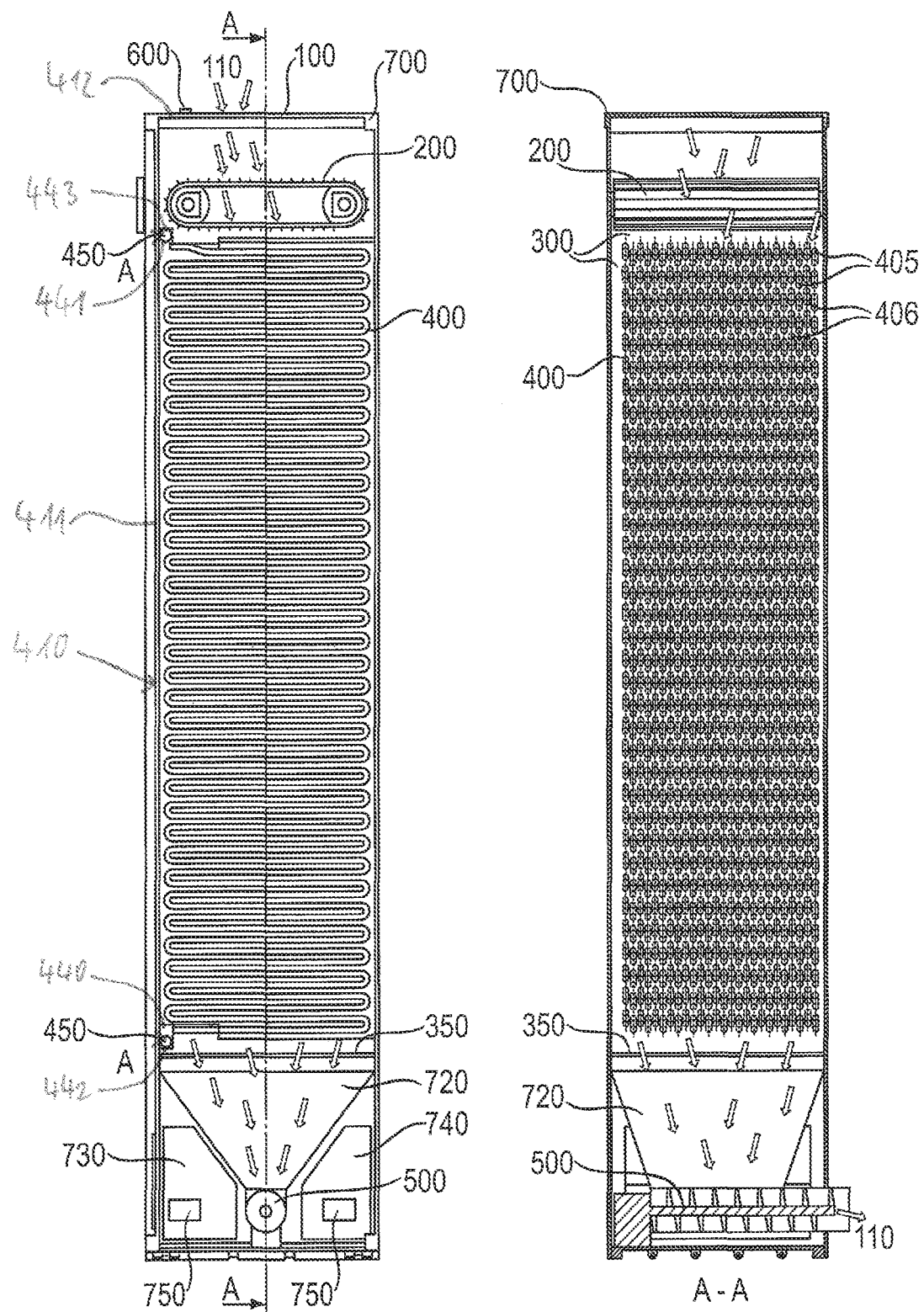

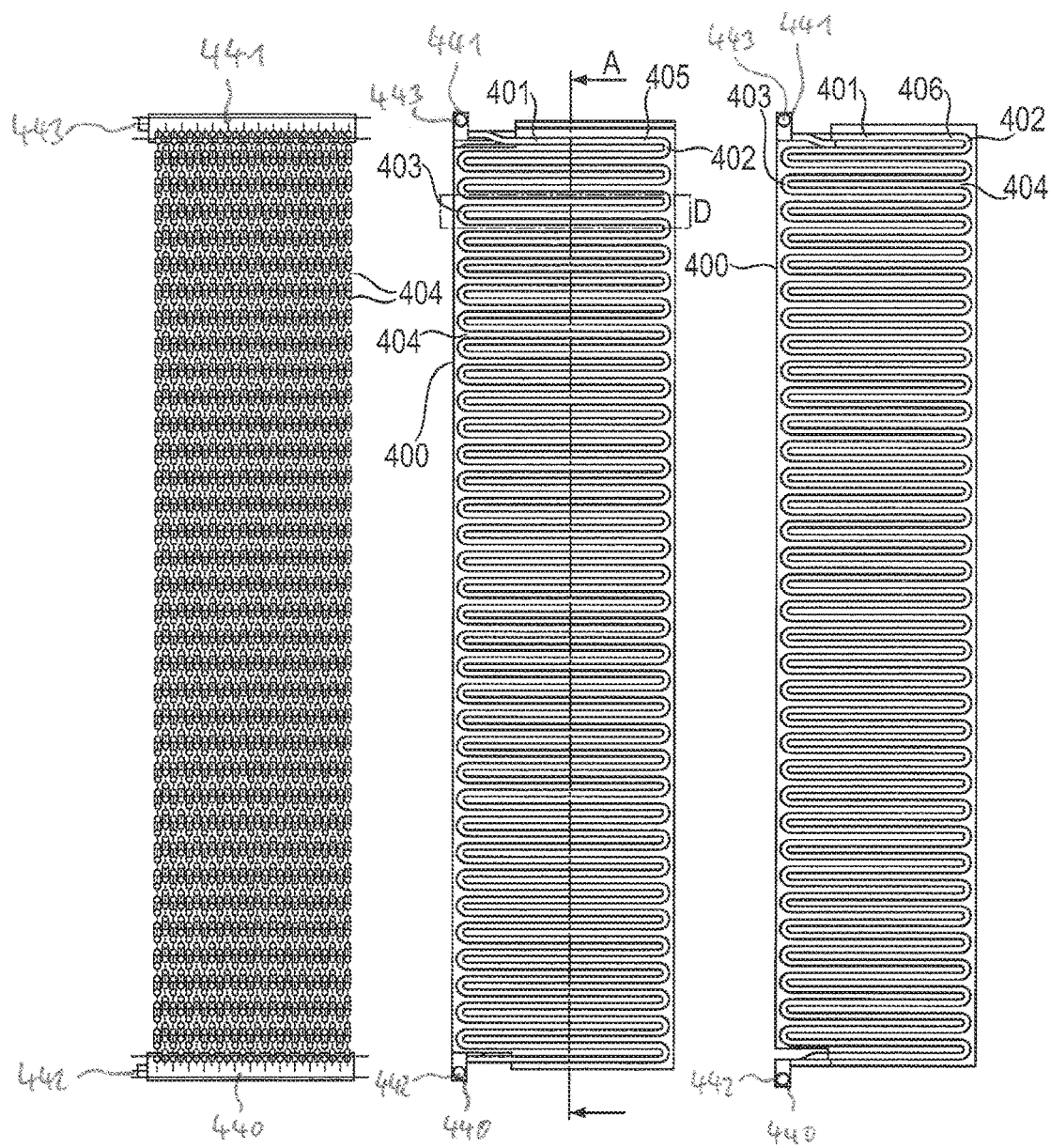

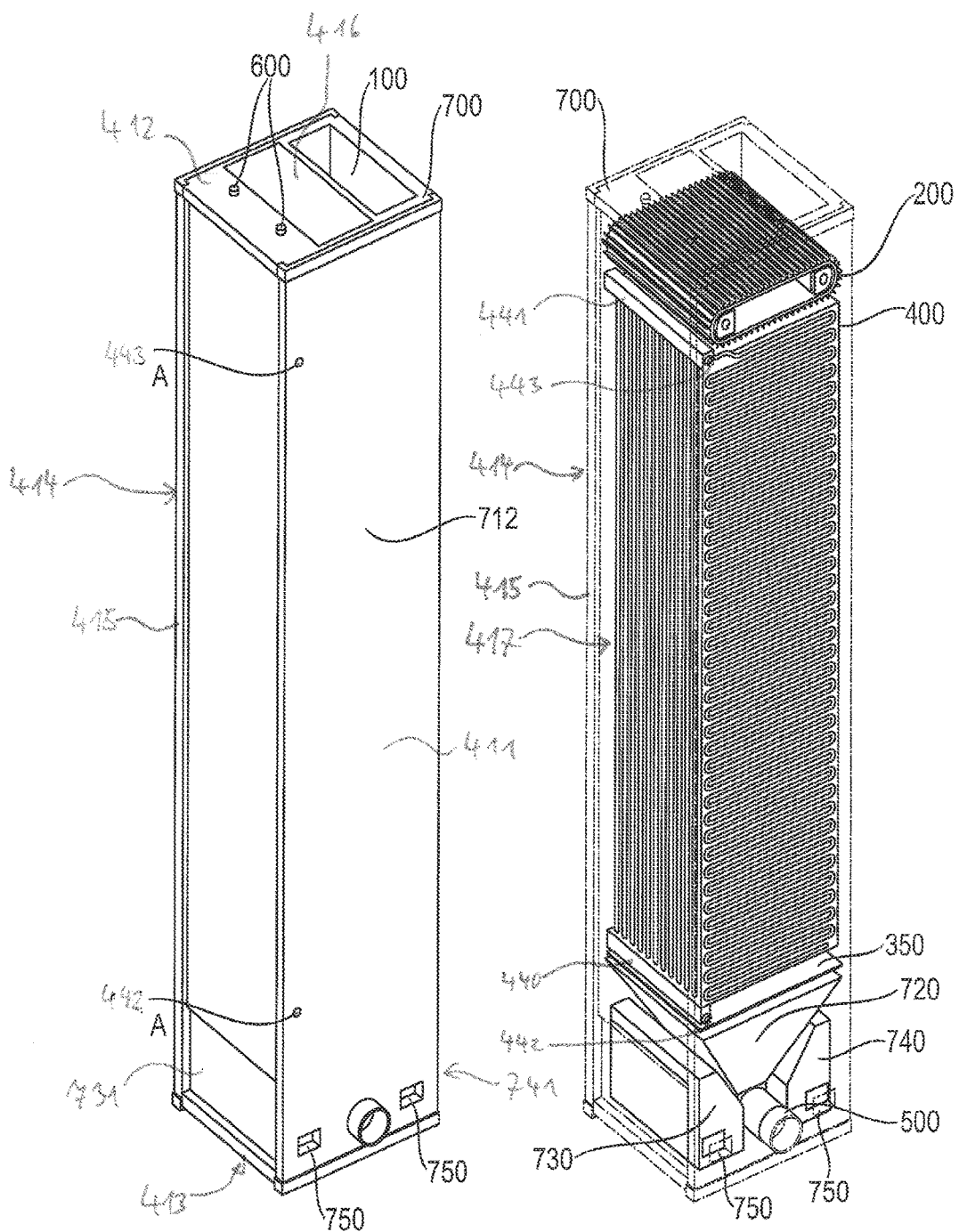

PLANT FOR THE PRODUCTION OF WOOD PELLETS OR OTHER SOLID GRANULATES FROM SMALL PIECES OF ORGANIC/PLANT MATERIAL

CROSS-REFERENCE TO RELATED APPLICATIONS

This application is a national stage entry from PCT/EP2014/075692 filed on Nov. 26, 2014 claiming the priority of German Patent Application No. 10 2013 224204.2, dated Nov. 27, 2013.

BACKGROUND OF THE INVENTION

The invention relates to a plant for producing wood pellets or other solid granules from small pieces of material of organic and/or plant origin suitable for being automatically fed to energy generating plants or other consumers, comprising devices for adding, preparing, drying, pressing, cooling and discharging the material that are at least partially arranged in individual transportable containers that can be assembled like modules for least part of the plant.

Wood pellets are rod-shaped granules that consist of sawing or planing shavings, wood chips, wood shredder material or other byproducts, or waste from the timber and forest industry. Other solid granules consisting of small pieces of material of organic and/or plant origin can for example be produced from straw, sunflower seed shells, olive pits and olive pressing residue, rice husks and other biological residue from, for example, agriculture and the food industry.

In the production of wood pellets, the supplied material is prepared to be pelletized, for example by commutation, drying and conditioning. The pellets are pressed from the prepared material. For this, an edge runner press is used in which the material is pressed through a die with holes according to the desired pellet diameter. The lignin contained in the material is released by the heating during conditioning, or respectively during the pressing process, and bonds the individual wood particles to each other. In addition to the lignin present in the wood, additional binding agent can be used. A knife cuts the pellet strands to the desired length after leaving the die. Then the pellets are cooled and thereby solidified.

Plants for producing wood pellets or other solid granules from small pieces of material of organic or plant origin are generally planned and developed by engineering offices or plant builders as individual projects for specific locations. In the process, machines and assemblies from different manufacturers are integrated, and interfaces and the transfer of material are worked out on a case-by-case basis depending on the respective situation. This frequently requires adaptations and improvements during assembly and elevated operating costs while operating the system.

The disadvantage of conventional pelletizing plants is high investment costs since basic engineering, detailed planning and architectural services must be performed on the setup site. This increases the cost risk since individual orders are involved (sometimes one-off production). Furthermore, there are problems with interfaces between different trades which necessitates adaptations. In each plant, safe operational management must be established by optimizing the processes. Since these are individually planned plants, the expense for stocking spare parts is high. Managing projects on-site requires a long planning and preparation phase. In addition, there are long assembly times and uncertain startup times.

EP 1 849 851 A2 describes a device for producing wood pellets from comminuted wood material which is purportedly easy and economical to set up and subsequently operate, and is also transportable. It is easily adaptable to new requirements such as changed processing quantities. For this purpose, the device has a frame scaffold with support panels or support racks for attaching hoppers, presses, coolers and dedusting devices. Cover panels can be attached to the frame scaffold. The frame scaffold and the plant parts attachable thereto constitute a transportable production module with a predetermined throughput. As needed, a plurality of these production modules can be combined in order to thereby increase the throughput without changing the dimensions of the plant parts of a production module. A disadvantage is the major effort in transporting the entire plant in one piece, and adapting to needs by combining a plurality of complete production modules.

DE 10 2006 061 340 B3 describes a facility for producing wood pellets with at least one assembly module for adding, drying, pressing and discharging. The assembly modules are introduced in a vertical arrangement of the respective functional assemblies in internationally standard containers (12 or 20 foot containers) A plurality of containers forming a horizontal and/or vertical row are connected to each other by electrical and/or pneumatic media lines, and one of the containers is connectable to a locally available media source. The easy and quick assembly of the plant is advantageous which consists of prepared assembly modules. The plant can be easily moved to a different location and only has to be locally stationary for a time. The disadvantage is that a drying shaft extends vertically over a plurality of stacked containers that are separated from each other during transport and must be joined together at the site of use. Another disadvantage is the limited output of the counter air cooler and the major energy requirement for the aspiration and separation of the wood dust. This comprises a container that can be filled from above with pellets and through which cooling air can flow from below, and from which the pellets are released at the bottom after cooling. Another disadvantage is the spatial allocation and proposed setup of the assembly modules that significantly increase the risk of damage in the event of fires and render extinguishing difficult. The high energy use, in particular for heating the raw material in the curing container by supplying extra generated energy is also disadvantageous.

Against this background, an object of the invention is to create a plant for producing wood pellets or other solid granules that can be transported, set up and move to a different location with less effort, and that enables energy-optimized operation.

SUMMARY OF THE INVENTION

The plant according to the invention for producing wood pellets or other solid granules from small pieces of material of organic and/or plant origin comprises devices for adding, preparing, drying, pressing, cooling and discharging the material that are at least partially arranged in individual transportable containers that can be assembled like modules for least a major part of the plant, wherein at least the device for cooling, when designed as a shaft cooler, is completely arranged in a container.

The plant according to the invention for producing wood pellets or other solid granules from small pieces of material of organic and/or plant origin comprises devices for adding, preparing, drying, pressing, cooling and discharging the material that are at least partially arranged in individual transportable containers that can be assembled like modules for least a major part of the plant, wherein the plant comprises a thermal buffer storage tank that is supplied with the heated cooling medium from the cooling medium outlet of the device for cooling, and from which cooled cooling medium is removed and supplied to the cooling medium inlet of the device for cooling, and from which heated heating medium is removed and supplied to the heating medium inlet of a heat consumer, and that is supplied cooled heating medium from a heating medium outlet of the heat consumer.

The plant according to the invention for producing wood pellets or other solid granules from small pieces of material of organic and/or plant origin comprises devices for adding, preparing, drying, pressing, cooling and discharging the material that are at least partially arranged in individual transportable containers that can be assembled like modules for least a part of the plant, wherein at least one of the cited devices for adding, preparing, drying, pressing, cooling and discharging is arranged in a container with a vertically oriented longitudinal axis.

The plant according to the invention for producing wood pellets or other solid granules from small pieces of material of organic and/or plant origin comprises devices for adding, preparing, drying, pressing, cooling and discharging the material that are at least partially arranged in individual transportable containers that can be assembled like modules for least a major part of the plant, wherein at least one container has a container shell, and at least one structural element of one of the cited devices for adding, preparing, drying, pressing, cooling and discharging is at least partially an element of the container shell.

According to a preferred embodiment, the plant has the features of several claims of claims 1 to 4 as desired. All combinations of features of several claims are part of the invention. The combinations of features of any two claims, and the combination of features of any three claims, as well as the combination of features of all four claims are elements of the invention.

All these solutions are based on containers that contain machines, aggregates, conveying devices, control devices and/or other components of the plant. The containers can be individually transported and assembled into a major part of the plant. One container or a plurality of containers together form a unit (module) of the plant. Modules of the plants are in particular the devices for adding, preparing, drying, pressing, cooling and discharging the material. The invention makes it possible to provide standardized modules consisting of standardized containers.

The containers can be equipped with components of the plant corresponding to the current state of development. The components are preferably securely mounted in the containers. The various mechanical and electrical components that are used can be reduced to a few types. In selecting and assembling the components, energy efficiency and quality can be optimized and ensured. The units are producible in the plant with a high degree of prefabrication, or respectively ready to use. The containers are economically transportable on rails, by roadway or water from the plant to the site of use, or from the earlier site of use to a new site of use. Depending on the respective conditions and requirements of the site of use, containers are combined into a complete plant based on the modular approach. The setup layout is flexible and adaptable to the respective site of use.

In the first solution, the effort for transporting and assembling is decreased, and the required space is reduced by entirely arranging the device for cooling (cooler) designed as a shaft cooler in only one container. In the second solution, a pelletizing plant is created that can be transported and set up with minimal effort and permits energy-optimized operation due to the heat recovery from the cooler in a thermal buffer storage tank (buffer storage tank) whose heat is supplied to a heat consumer. In the third solution, the incorporation of devices in a container with a vertically oriented longitudinal axis facilitates ease of transport, economical assembly and a space-saving arrangement of dryers, coolers or other elongated components which otherwise would have to be distributed to a plurality of containers and assembled at the site. The required footprint of the plant is reduced due to the vertically oriented longitudinal axis. In the fourth solution, material and weight are saved due to the integral design of the container shell and device arranged therein, and ease of transport, economical assembly and a space-saving arrangement are thereby facilitated.

The solutions according to the invention have the advantage of enabling the production of standardized plants that consist of containers which can be assembled without interface problems, and that contain proven, tested, coordinated components which correspond to the latest state of development. Special production of individual components can be an omitted.

Since the plants are nearly structurally identical and preferably have a standardized control system, personnel can be trained and familiarized before starting up the system using a model plant (master). The safety of operational management is improved by optimizing components and preventative maintenance of components. Stocking spare parts on the site can be reduced, or respectively optimized by using fewer brands that are always the same and using a central warehouse. The planning and preparation phase for managing the project on-site is significantly reduced. Likewise, the long on-site assembly times are reduced. Investment costs are also reduced since the basic engineering, detailed planning and a majority of architectural services are omitted. The cost risk of investment is reduced since the technology from mass production or small series production can be offered at a fixed price.

According to one embodiment, the container has the dimensions of a 20 foot or a 40 foot container, or another standard container. This is advantageous for transporting the container using available means of transportation. According to one preferred embodiment, the container has the features (such as stackability, transportability, lashing to each other) of standard containers. According to another embodiment, the container is a frame structure with open walls or one or more closed walls. The frame structure has a frame consisting of a plurality of frame parts. When the frame structure is open, frame parts are surrounded by openings that are not filled with walls. When the frame structure is closed, the openings between the frame parts are filled, or respectively closed by walls. Mixed forms with a partially open and partially closed frame structure are also elements of the invention. The frame structure is preferably cuboid, wherein the frame parts define the edges of the cube.

The design of the frame structure reduces weight and cost. In addition, it makes it easier to assemble, operate and service the plant.

Alternatively, the container is a conventional, standard container with closed walls. According to one embodiment, the container is formed by walls connected at the edges. The walls and/or the connections of adjacent walls with each other may be reinforced at the corners and/or edges of the container.

When the container is designed as a frame structure with open walls, the frame parts form the container shell. When the container is designed as a frame structure with one or more closed walls, the frame parts and walls that fill them in form the container shell. When the container is designed as a box consisting of the walls connected to each other at the edge, the walls form the container shell. In the fourth solution, at least one structural element of a device arranged at least partially in the container is an element of the container sleeve shell. The device is one of the devices for adding, preparing, drying, pressing, cooling and discharging the small pieces of material. According to one preferred embodiment, at least one structural element of the device is an element of at least one wall and/or at least one frame part of the frame. According to another embodiment, at least one side wall and/or at least one frame part of a device is an element of a wall and/or a frame part of the container. For example, at least one side wall of a cooler housing of the cooler which borders a room in which the granules to be cooled are cooled is an element of a wall of the container, or forms the entire wall of the container. In another example, at least one side of the housing of the dryer, or of a thermal buffer storage tank, is an element of a wall of the container, or forms the entire wall of the container. Preferably, a plurality of side walls of the device are simultaneously walls of the container, or elements thereof.

According to another embodiment, the device for drying is a belt dryer that is arranged in ne or more containers with a horizontally oriented longitudinal axis. This renders the area surrounded by the container optimally useful. According to another embodiment, the device for cooling is arranged in a container with a vertically oriented longitudinal axis. In particular when the device for cooling is designed as a shaft cooler, this renders the area enclosed by the container optimally useful.

According to another embodiment, at least one of the following devices is entirely located in a container: Device for adding, sieve, wet macerator, buffer and metering tank, device for drying (such as a bath dryer), dry mill, conditioner, mixing screw, device for pressing, device for cooling (such as a shaft cooler), thermal buffer storage tank, device for storing or device for discharging the material. The cited devices can be designed compact enough to be able to be accommodated in only a single container. A plurality of these devices may be accommodated in a single container. Large plants can have a plurality of the same devices which are each accommodated in a separate container which are operated simultaneously.

According to another embodiment, the plant has a plurality of devices for cooling designed as shaft coolers that are each arranged completely in one container. This is good for plants with a particularly high throughput using standardized containers.

According to another embodiment, at least one of the following devices is arranged in a container with a horizontally oriented longitudinal axis: A device for adding, a device for preparing and pressing, a device for discharging product. According to another embodiment, at least one of the following devices is accommodated in a container with a vertically oriented longitudinal axis: A device for intermediate storage, or a device for storing. The cited devices are each suitable for being accommodated in a container with a horizontal, or respectively vertically oriented longitudinal axis.

According to another embodiment, the shaft cooler comprises a plurality of pipe meanders that are arranged parallel at a distance from each other and are offset in height by one-half the distance of their horizontal pipe sections. The pipe meanders are preferably oriented vertically. The material is alternately deflected horizontally in one direction and the other direction by the horizontal pipe sections of the pipe meanders while passing through the shafts of the shaft cooler formed by the pipe meanders. The shaft cooler cools the wood pellets or other solid pourable biofuels quite effectively and sparingly (in particular avoiding the formation of dust and large amounts of exhaust air) and has a small footprint and space requirement.

According to another embodiment, the horizontal pipe sections of each pipe meander are connected to each other by vertical bars. The vertical bars improve the stability of the pipe meander. In addition, they cause the material to be conducted in a manner advantageous for even cooling and enlarge the heat exchanger surface.

The pipe meanders are for example formed from bent pipes between which bars are inserted. According to another embodiment, the pipe meanders and bars are formed from metal plates that are shaped (for example by deep-drawing processes or hydroforming processes) and metal plates connected to each other analogous to known panel radiators made of plate steel.

According to another embodiment, the shaft cooler has a discharge floor at the bottom with an adjustable opening cross-section to regulate the fill level of the material within the shafts, and/or the shaft cooler has a feeding device at the top for evenly distributing material to the various shafts. The shaft cooler can be operated very effectively by means of the discharge floor and/or the feeding device.

According to another embodiment, a thermal buffer storage tank is available which is supplied the heated cooling medium from the cooling medium outlet of the device for cooling, from which cooled cooling medium is withdrawn and supplied to the cooling medium inlet of the device for cooling, from which heated feeding medium is withdrawn and supplied to the heating medium inlet of a heat consumer and to which the cooled feeding medium from a heating medium outlet of the heat consumer is supplied. A particularly energy-efficient operation of the plant is achieved by using the thermal energy absorbed from the cooling medium for the consumer. The thermal buffer storage tank promotes efficient plant operation when the heat requirement of the heat exchanger fluctuates.

According to another embodiment, the thermal buffer storage tank is a stratified storage tank that has a drain at the bottom for cooled cooling medium, an outlet at the top for heated heating medium, an inlet for heated cooling medium between the two cited outlets, and an inlet for cooled heating medium between the outlet for heated heating medium and the inlet for heated cooling medium. The thermal buffer storage tank can be a conventional stratified storage tank like the tanks used in heating technology. With this embodiment, the cooling circuit and heating circuit are connected to each other through the stratified storage tank, and the cooling medium is simultaneously the heating medium. This embodiment is comparatively uncomplex.

According to another embodiment, the thermal buffer storage tank is a buffer storage tank with a heat exchanger having an entrance connected to the cooling medium inlet for heated cooling medium of the cooler, and having an discharge connected to the cooling medium inlet of the cooler, wherein the thermal buffer storage tank has an outlet at the top for heated heating medium that is connected to the heating medium inlet of the heat consumer, and has an inlet at the bottom for cooled heating medium that is connected to the heating medium outlet of the heat consumer. In this design, the circuit of the cooling medium and heating medium are separate from each other. This makes it possible to set an overpressure in the cooling circuit as needed to prevent the evaporation of cooling medium strongly heated in the cooler.

According to another embodiment, the heat consumer is a device for conditioning (conditioner) the small parts of a material, or another heat consumer of the plant for producing wood pellets or other solid granules. The heat requirement of the heat consumer can fluctuate in particular from changes in the employed starting material, or due to different throughputs.

According to another advantageous embodiment, the cooling circuit and/or the heating circuit has a circulating pump. By regulating the circulating pump, the cooling of the material in the cooler, or respectively the heating of the material in the conditioner, can be adjusted.

In another embodiment, the use of a fire protection and fire extinguishing system are provided. The fire protection system has for example temperature sensors, spark detectors and spark extinguishers. The fire extinguishing system contains for example a nitrogen flooding system including nitrogen storage, and and a blowing system. The nitrogen is introduced provisionally from below through the discharge floor (slotted floor).

According to another embodiment, the cooler is connected to a device for exhausting vapors and residual steam.

According to another embodiment, the cooler is connected to a device for exhausting vapors and residual steam, and heat recovery is integrated into the device for exhausting. This further improves the energy efficiency of the plant.

According to another embodiment, the container has specific interfaces for at least one of the following media and flows: High-voltage current, low-voltage current, control current, feedwater, compressed air, air exhaustion, coolant, heat medium, wet raw material, dry raw material, fine material, pellets, fines/sifted material. The specific interfaces simplify the modular assembly of the containers of the plant, or respectively a significant portion thereof.

According to another embodiment, containers are arranged horizontally or vertically in at least one group. This reduces the complexity of the connecting lines between the different components and fosters space saving accommodation.

According to another embodiment, at least one device for storing has a quick-installation silo or a quick-installation hall which is arranged separately from the containers. It is particularly economical to use quick-installation silos or quick-installation halls. In addition, the storage of material in quick-installation silos or quick-installation halls separate from the containers is advantageous for reasons of fire and explosion protection.

BRIEF DESCRIPTION OF THE SEVERAL VIEWS OF THE DRAWINGS

The invention will be further explained below with reference to the accompanying drawings of exemplary embodiments. In the drawings:

FIG. 4 shows a first vertical section of a shaft cooler;

FIG. 5 shows a second vertical section of the shaft cooler;

FIG. 6 shows a side view of the pipe meander of the shaft cooler;

FIG. 7 shows a front view of the pipe meander of the shaft cooler;

FIG. 8 shows a front view of another pipe meander of the shaft cooler;

FIG. 9 shows an overview drawing of the shaft cooler (outside view);

FIG. 10 shows an overview drawing of the shaft cooler (inside view);

DETAILED DESCRIPTION OF THE INVENTION

Figure 1:
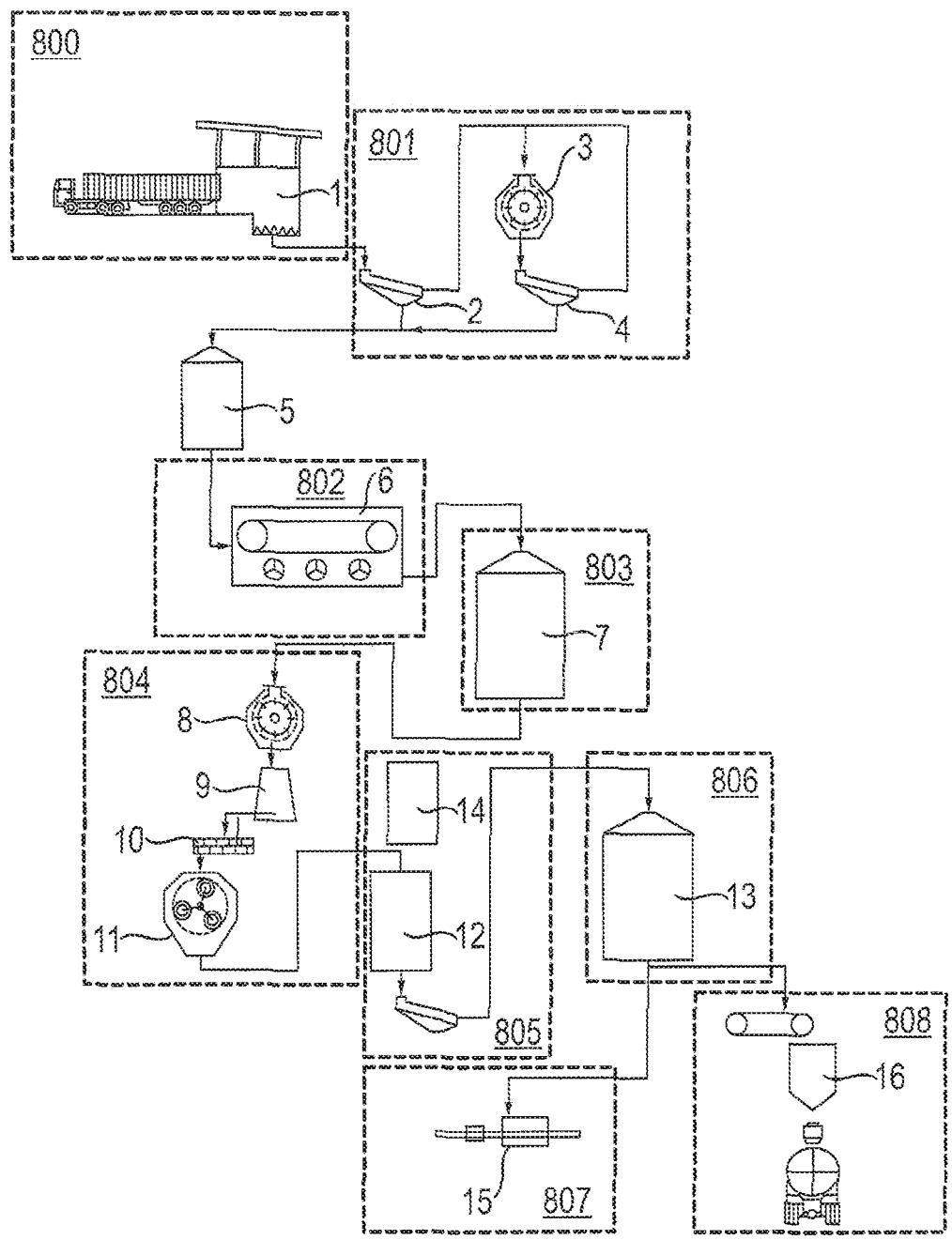
FIG. 1 shows a highly schematic representation of the plant.

FIG. 1 schematically portrays an exemplary embodiment of the invention. Different modules 800 to 808 of the plant are enclosed in dashed lines. Preferably, the modules consist of one or more containers containing components of the plant. This is the case in the example in modules 800, 801, 802, 804, 805 and 807, 808. In the example, modules 803 and 806 are silos.

Raw materials such as sawdust are delivered in a truck and unloaded into the raw material receiving unit 1. The raw material may be stored sorted according to quality, or respectively features, on a site and supplied to the plant in appropriate mixtures, for example using a wheel loader.

In the plant, the raw material is fractionated with the sieve 2, the large fraction is macerated in the wet macerator 3, the fine fraction is added to the buffer and metering tank 5. After being macerated in the wet macerator 3 and passing through the sieve 4, the fine fraction is also added to the buffer and metering tank 5.

This is followed by drying in the dryer 6 and then intermediate storage in the storage silo 7. Next comes the metered conveyance to the dry mill 8 where the material is crushed to the optimum particle size. Then the material is prepared to be pressed in the conditioner 9. After passing through the mixing screw 10 into which binding agent may be supplied, the prepared raw material enters the press 11.

Following the pressing process in the press 11, hot pellets are cooled in the cooler 12 and introduced into the storage silo 13 to be stored. The released heat from the cooling process is supplied in a metered manner to the conditioner 9 via the thermal buffer storage tank 14. After being stored, the pellets are packaged into small packages in the packaging installation 15 or are loaded directly as bulk material in the loading installation 16.

Figure 2:
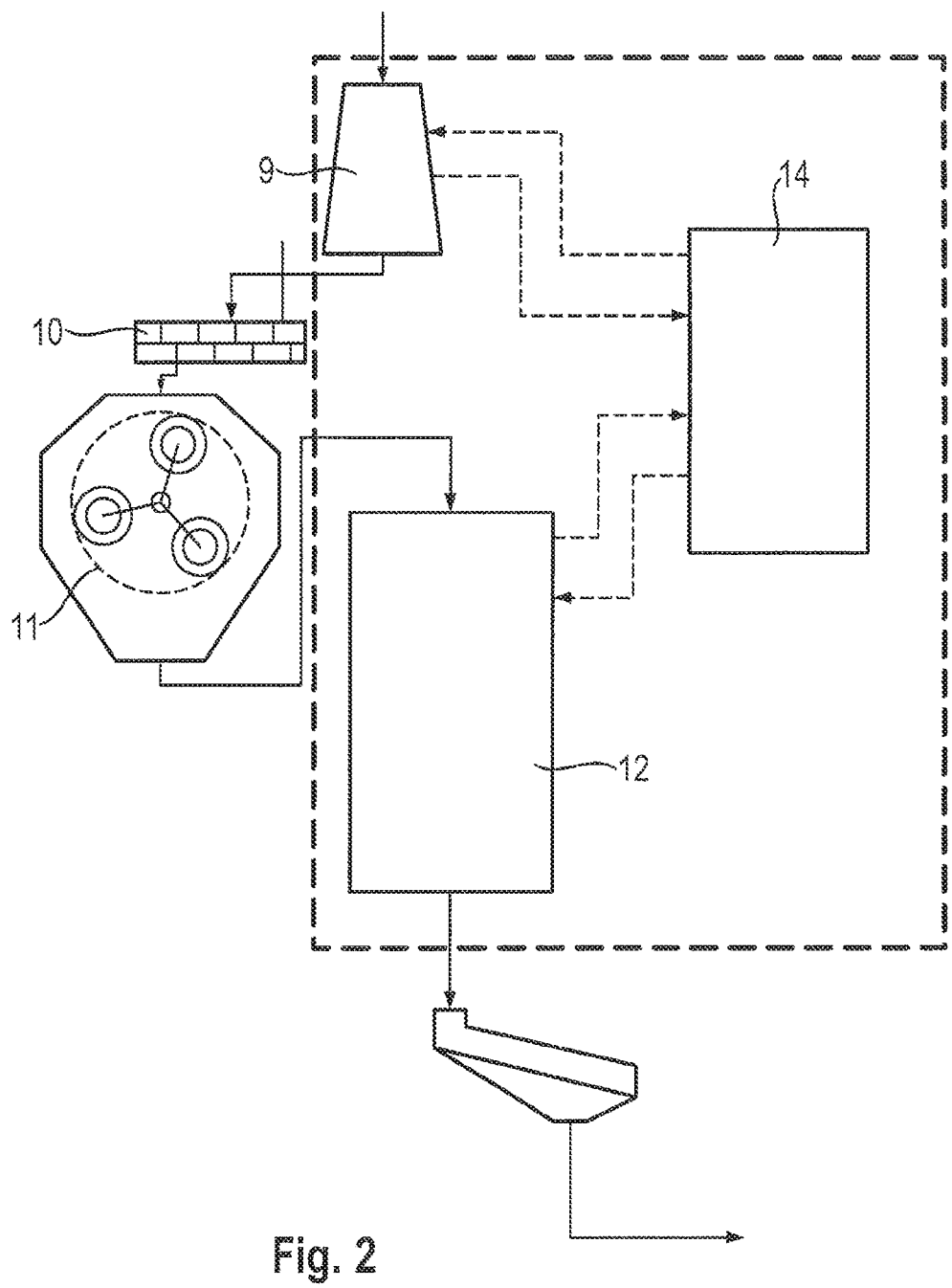
FIG. 2 shows a partial schematic of a first version of heat recovery.

The cooling of the pellets and use of released heat will be explained with reference to FIG. 2.

Through heat exchanger surfaces in the cooler 12, the heat from pellets is transferred to the heat medium (water or thermal oil) and transported to the thermal buffer storage tank 14. In the thermal buffer storage tank 14, hot heat medium rises upward, and cold heat medium sinks downward. The thermal energy from the heat medium is transferred as needed to preheat and condition the prepared raw material in the conditioner. The thermal buffer storage tank 14 is preferably designed as a stratified tank and can optionally be equipped with an electrical heating rod or another outside heater to raise the temperature in starting sequences.

Figure 3:
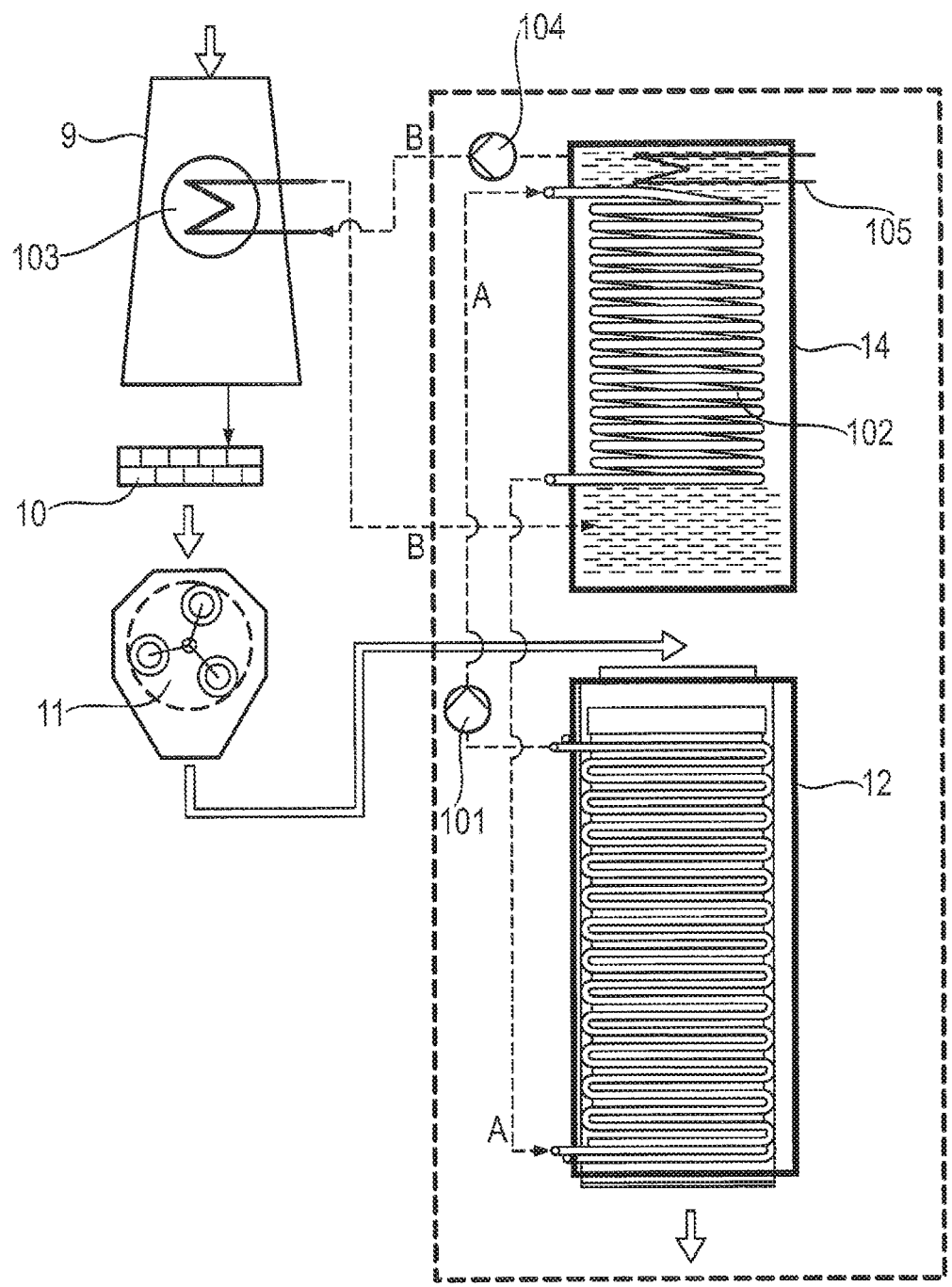
FIG. 3 shows a partial schematic of a second version of heat recovery.

An alternative heat recovery is explained with reference to FIG. 3.

Through heat exchanger surfaces in the cooler 12, the heat from pellets is transferred to the heat medium A (water or thermal oil) and transported to the thermal buffer storage tank 14. In the process, the heat medium A is moved in a closed circuit through the cooler 12 and thermal buffer storage tank 14 and does not come directly into contact with the heat medium B from the closed circuit through the thermal buffer storage tank 14 and conditioner 9. The coverage of the required feed rate is ensured by a circulating pump 101.

In the design version with water as the heat medium A, the regulation of the circulating pump 101 is implemented such that any steam formation in the pipe system is prevented by increasing the feed rate. Another design version provides operation with a slight overpressure to prevent the formation of steam. In this case, a pressure-resistant design of the heat exchanger and lines is provided.

In the thermal buffer storage tank 14, the thermal energy is transferred by a tube heat exchanger 102 to the heat medium B (water) that is located in the tank of the thermal buffer storage tank. The thermal energy is transferred as needed to preheat and condition the prepared raw material by means of a plate heat exchanger 103 in the conditioner. The required delivery speed is ensured by a circulating pump 104.

The thermal buffer storage tank 14 is preferably designed as a stratified tank and can optionally be equipped with an outside heater (such as an electrical heating rod) 105 to raise the temperature in starting sequences. The size of the thermal buffer storage tank 14 and system controls are configured so that the heat from the cooler 12 can be reliably drawn at a time.

The design and functioning of the cooler 12 designed as a shaft cooler (see FIGS. 9 and 10) will be explained with reference to FIG. 4 to 10.

Hot pellets (approximately 90-100° C.) 110 are introduced through the filling opening 100 in a cover wall 412 of a box-shaped cooler housing 410 and distributed with a drag chain conveyor 200 arranged below the cover wall over parallel, vertical shafts 300 within four side walls 411 of the cooler housing 410. A movable slotted floor 350 below the shafts 300 remains closed until the shafts 300 are full. Coolant 450 is guided through a heat exchanger body 400 and absorbs the thermal energy of pellets 110. The pellets 110 continuously and evenly slide downward into the shafts 300 wherein their speed is regulated by the gap size in the slotted floor 350. After passing through the slotted floor 350, the cooled pellets 110 are supplied by a discharge funnel 720 to a discharge screw 500 and are discharged therefrom. The discharge funnel 720 borders the bottom of the cooler housing 410. The openings 600 in the cover wall 410 serve to release vapors and residual steam from the hot pellets 110. Furthermore, an inspection flap 416 is in the cover wall 412.

The design of the heat exchanger bodies 400 is depicted in FIG. 4 to 8.

The heat exchanger bodies 400 are designed as connected serpentine pipe systems. The heat exchanger bodies 400 have parallel, horizontal pipe sections 401 that are connected at the ends by pipe elbows 402 with which they form pipe meanders 403. Furthermore, they have vertical bars 404 between adjacent horizontal pipe sections 401.

Two groups 405, 406 of heat exchanger bodies 400 are installed, wherein the horizontal pipe sections 401 of the heat exchanger bodies 400 of different groups 405, 406 are offset from each other by one-half of the distance D between two adjacent, horizontal pipe sections 401 of a heat exchanger body 400. This causes a sideways movement of the pellets 110 in the shaft 300 and an enlargement of the contact surface. At the same time, there is a proportionate circulation of the pellets 110 in the shaft 300 which improves the evenness of the cooling.

Each pipe meander 403 terminates at the bottom in a bottom manifold 440 and at the top in a top manifold 441. The bottom manifold 440 has a bottom opening 442 in a sidewall 411 of the cooler 12 which serves as a cooling medium inlet. The top manifold 441 has a top opening 443 in a top end in a sidewall 411 of the cooler 12 which serves as a cooling medium outlet. The coolant 450 enters through the bottom opening 442 into the cooler 12 and the leaves therefrom through the top opening 443.

One or more components of the plant are completely accommodated in a horizontal or vertically oriented container. One or more containers form modules 800 to 808 of the plant (see FIG. 1).

FIGS. 9 and 10 show a vertically oriented container 700 which contains a complete shaft cooler 712. The side walls 411 and cover wall 412 of the cooler housing 410 are simultaneously the outer walls of the container 700. The side walls 411 preferably extend to the bottom end of the container 700. The container 700 preferably has a bottom wall 413 at the bottom. Preferably, the container 700 has a frame 414, and the side walls 411, cover wall 412 and floor wall 413 are held in openings 417 on the side between frame parts 415 of the frame 414 to form an at least partially enclosed frame. Due to the integral design of the walls 411, 412 and frame parts 415 of the cooler housing 410 and container 700, bearing structural elements of the container 700 are simultaneously elements of the cooler 12 which saves materials and weight.

According to FIGS. 4, 9 and 10, control cabinets 730, 740 are arranged in the spaces within the container 700 on both sides of a discharge funnel 720 that supplies the cooled pellets to the discharge screw 500. Interfaces 750 for energy and data are located on the control cabinets 730 and 740. At that location, the walls of the container 700 preferably have inspection flaps or inspection openings 731, 741.

REFERENCE NUMBER LIST

1 Raw material receiving unit
2 Sieve
3 Wet macerator
4 Sieve
5 Buffer and metering tank
6 Dryer
7 Storage silo
8 Dry mill
9 Conditioner
10 Mixing screw
11 Press
12 Cooler
13 Storage silo
14 Thermal buffer storage tank
15 Packaging system
16 Loading installation
100 Filling opening
101 Circulating pump
102 Pipe heat exchanger
103 Plate heat exchanger
104 Circulating pump
105 Outside heater
110 Pellets
200 Drag chain conveyor
300 Shaft 350 Slotted floor
400 Heat exchanger body
401 Horizontal pipe section
402 Pipe elbow
403 Pipe meander
404 Vertical bar
405 Group
406 Group
410 Cooler housing
411 Side wall
412 Cover wall
413 Floor wall
414 Frame
415 Frame part
416 Inspection flap
417 Opening
440 Bottom manifold
441 Top manifold
442 Bottom opening
443 Top opening
450 Coolant
500 Discharge screw
600 Opening
700 Container
712 Shaft cooler
720 Discharge funnel
730 Control cabinet
731 Inspection opening
740 Control cabinet
741 Inspection opening
750 Interface for energy and data
800-808 Module

The invention claimed is:

1. A plant for producing wood pellets or other solid granules from small pieces of material of organic and/or plant origin comprising devices for adding (1), preparing (2 to 4), drying (6), pressing (11), cooling (12) and discharging (16) the material that are at least partially arranged in individual transportable containers (700) that can be assembled like modules for least a major part of the plant, wherein at least the device for cooling (12), when designed as a shaft cooler (712), is completely arranged in a container (700).

2. The plant according to claim 1, wherein the plant comprises a thermal buffer storage tank (14) that is supplied with the heated cooling medium from the cooling medium outlet of the device for cooling (12), and from which cooled cooling medium is removed and supplied to the cooling medium inlet of the device for cooling (12), and from which heated heating medium is removed and supplied to the heating medium inlet of a heat consumer (9), and that is supplied cooled heating medium from a heating medium outlet of the heat consumer (9).

3. The plant according to claim 1, wherein at least one of the cited devices for adding (1), preparing (2 to 4), drying (6), pressing (11), cooling (12) and discharging (16) is arranged in a container with a vertically oriented longitudinal axis.

4. The plant according to claim 1, wherein at least one container has a container shell, and at least one structural element (411) of one of the cited devices (12) for adding (1), preparing (2 to 4), drying (6), pressing (11), cooling (12) and discharging (16) is at least partially an element of the container shell.

5. The plant according to claim 1, wherein the container (700) has the dimensions of a 20-foot or 40-foot container, or another standard container.

6. The plant according to claim 1, wherein the container (700) has a frame (414) with a plurality of frame parts (415), and openings (417) between frame parts (415) are not filled by walls (711), and/or openings (417) between frame parts (415) are filled by walls.

7. The plant according to claims 4, wherein the at least one structural element of a device (12) is an element of at least one wall and/or at least one frame part (415) of the frame (414) of the container (706).

8. The plant according to claim 7, wherein the at least one side wall (411) of a device (12) is an element of a wall of the container (700).

9. The plant according to claim 1, wherein the device for drying (6) is a belt dryer that is arranged in one or more containers with a horizontally oriented longitudinal axis, and/or wherein the device for cooling (12) is arranged in a container (700) with a vertically oriented longitudinal axis.

10. The plant according to claim 1, wherein at least one of the following devices is completely accommodated in a container(700): Device for adding (1), sieve (2,4), wet macerator (3), buffer and metering tank (5), device for drying (6), dry mill (8), conditioner (9), mixing screw (10), device for pressing (11), device for cooling (12), thermal buffer storage tank (14), device for storing (13) or device for adding material (16).

11. The plant according to claim 1, wherein at least one of the following devices is arranged in a container with a horizontally oriented longitudinal axis: Device for adding (1), device for preparing (2,3,4), device for drying (6), device for pressing (11), device for discharging (16), and/or wherein at least one of the following devices is located in a container (700) with a vertically oriented longitudinal axis: Device for intermediate storage (3), device for cooling (12) or device for storing (13).

12. The plant according to claim 1, wherein the shaft cooler (712) comprises a plurality of pipe meanders that are arranged parallel at a distance from each other and are offset in height by one-half the distance of their horizontal pipe sections (401) so that the material is alternately deflected horizontally in one direction and the other direction by the horizontal pipe sections (401) of the pipe meanders (403) while passing through the shafts (300) of the shaft cooler (712) formed by the pipe meanders.

13. The plant according to claim 12, wherein the horizontal pipe sections (401) of each pipe meander are connected to each other by vertical bars (404).

14. The plant according to claim 1, wherein the shaft cooler (712) Has a discharge floor (350) at the bottom with an adjustable opening cross-section to regulate the fill level of the material within the shafts (300), and/or the shaft cooler has a feeding device (200) at the top for evenly distributing material to the various shafts (300).

15. The plant according to claim 2, wherein the thermal buffer storage tank (14) is a stratified storage tank that has a drain at the bottom for cooled cooling medium, an outlet at the top for heated heating medium, an inlet at the top for heated cooling medium, and an inlet at the bottom for cooled heating medium.

16. The plant according to claim 15, wherein the thermal buffer storage tank (14) is a stratified storage tank with a heat exchanger (102) having an entrance connected to the cooling medium inlet for heated cooling medium of the cooler (12), and having a discharge connected to the entrance for cooled cooling medium, wherein the thermal buffer storage tank (14) has an outlet at the top for heated heating medium that is connected to the heating medium inlet of the heat consumer (9), and has an inlet at the bottom for cooled heating medium that is connected to the heating medium outlet of the heat consumer (9).

17. The plant according to claim 16, wherein the heat consumer is a device for conditioning (9) the small pieces of material or another heat consumer of the plant.

18. The plant according to claim 1, wherein the cooler (12) is connected to a device for exhausting vapors and residual steam, and heat recovery is integrated into the device for exhausting.

19. The plant according claim 1, comprising a plurality of devices for drying (6) that are each completely arranged in a container (700), and/or that has a plurality of devices for cooling (12) designed as shaft coolers (712) that are completely arranged in a container (700).

20. The plant according to claim 1, wherein the container (700) has specific interfaces for at least one of the following media and flows: High-voltage current, low-voltage current, control current, feedwater, compressed air, air exhaustion, coolant, heat medium, wet raw material, dry raw material, sawdust, pellets and fines.

21. The plant according to claim 1, wherein the containers are arranged horizontally in groups and/or vertically in groups.

22. The plant according to claim 1 that has at least one device for storing (3,7,13) that is designed has a quick-installation silo or quick-installation hall that is arranged separate from the containers (700).

23. The plant according to claim 6, wherein the at least one structural element of a device (12) is an element of at least one wall and/or at least on frame part (415) of the frame (414) of the container (706).

* * * * *

UNITED STATES PATENT AND TRADEMARK OFFICE
CERTIFICATE OF CORRECTION

PATENT NO. : 9,688,932 B2
APPLICATION NO. : 15/038640
DATED : June 27, 2017
INVENTOR(S) : Valery Detzel It is certified that error appears in the above-identified patent and that said Letters Patent is hereby corrected as shown below:

In the Claims

Column 12, Line 6, delete "claims" and replace with "claim".

Column 12, Line 21, delete "container(700)" and replace with "container (700)".

Column 12, Line 49, delete "Has" and replace with "has".

Column 13, Line 31, delete "on" and replace with "one".

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*